US009944778B2

(12) United States Patent
Gelissen et al.

(10) Patent No.: US 9,944,778 B2
(45) Date of Patent: Apr. 17, 2018

(54) MICROSPHERES

(71) Applicant: Merck Patent GmbH, Darmstadt (DE)

(72) Inventors: Franciscus Wilhelmus Maria Gelissen, Selfkant (DE); Franciscus Gerardus Henricus Van Duijnhoven, Mierlo (NL)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 14/436,132

(22) PCT Filed: Oct. 16, 2013

(86) PCT No.: PCT/EP2013/003114
§ 371 (c)(1),
(2) Date: Apr. 16, 2015

(87) PCT Pub. No.: WO2014/060099
PCT Pub. Date: Apr. 24, 2014

(65) Prior Publication Data
US 2015/0259518 A1  Sep. 17, 2015

(30) Foreign Application Priority Data

Oct. 19, 2012 (EP) .................................. 12007238

(51) Int. Cl.
| | |
|---|---|
| *C08L 23/06* | (2006.01) |
| *C09B 67/02* | (2006.01) |
| *B41M 5/26* | (2006.01) |
| *B01J 13/04* | (2006.01) |
| *B23K 26/00* | (2014.01) |

(52) U.S. Cl.
CPC .......... *C08L 23/06* (2013.01); *C09B 67/0097* (2013.01); *C08L 2205/03* (2013.01); *C08L 2205/18* (2013.01)

(58) Field of Classification Search
CPC .. C08L 23/06; C08L 2205/03; C08L 2205/18; B41M 5/26; B01J 13/04; B23K 26/00
USPC ............. 252/582; 428/404, 407; 522/2, 165, 522/166; 523/201; 524/430, 500, 601, 524/606
See application file for complete search history.

(56) References Cited

U.S. PATENT DOCUMENTS

| | | | |
|---|---|---|---|
| 6,531,157 B1 | 3/2003 | Hahnlein et al. | |
| 6,887,938 B2 | 5/2005 | Atkinson | |
| 7,674,845 B2 | 3/2010 | Van Duijnhoven et al. | |
| 7,678,451 B2 | 3/2010 | Gelissen et al. | |
| 2004/0152820 A1 | 8/2004 | Atkinson | |
| 2006/0074165 A1 | 4/2006 | Gelissen et al. | |
| 2006/0148968 A1 | 7/2006 | Van Duijnhoven et al. | |
| 2007/0029294 A1* | 2/2007 | Peng .................. B23K 26/0626 219/121.69 |
| 2008/0299344 A1* | 12/2008 | Colhoun et al. ........... 428/36.92 |
| 2011/0034609 A1 | 2/2011 | Duijnhoven Van et al. | |
| 2012/0298933 A1 | 11/2012 | Gelissen et al. | |

FOREIGN PATENT DOCUMENTS

| | | | |
|---|---|---|---|
| CN | 1431039 A | | 7/2003 |
| CN | 101903182 A | | 12/2010 |
| EP | 0835613 A2 | | 4/1998 |
| JP | 05339439 A | | 12/1993 |
| JP | 2003165535 A | | 6/2003 |
| JP | 2007500283 A | | 1/2007 |
| JP | 2009161707 A | | 7/2009 |
| WO | 2009003976 A1 | | 1/2009 |
| WO | WO 2009/003976 A1 | * | 1/2009 |
| WO | 2011050934 A2 | | 5/2011 |

OTHER PUBLICATIONS

International Search Report from PCT Application No. PCT/EP2013/003114 dated May 26, 2014.
Chinese Search Report dated Apr. 20, 2016, issued in corresponding Chinese Application 201380053994.7, 13 pages.
English translation Abstract of CN101903182A published Dec. 1, 2010 (1 page).
English translation Abstract of CN1431039A published Jul. 23, 2003 (1 page).
English translation Abstract of EP0835613A2 published Apr. 15, 1998 (1 page).
Machine Translation of JP 2003165535—Publication Date: Jun. 10, 2003.
Machine Translation of JP 2009161707—Publication Date: Jul. 23, 2009.
Machine Translation of JP5339439A—Publication Date: Dec. 21, 1993.
Notice of Reason(s) for Rejection—dated Sep. 29, 2017—Date of Dispatch: Oct. 10, 2017—Corresponding Japanese Patent Application No. 2015-537164.

* cited by examiner

*Primary Examiner* — Bijan Ahvazi

(74) *Attorney, Agent, or Firm* — Millen White Zelano and Branigan, PC; Csaba Henter

(57) ABSTRACT

The present invention relates to microspheres and to their use, preferably as laser absorbing additive, and to a process for their production.

25 Claims, No Drawings

MICROSPHERES

The present invention relates to microspheres and to their use, preferably as laser absorbing additive, and to a process for their production.

The identification marking of products is becoming increasingly important in almost every branch of industry. For example, it is frequently necessary to apply production dates, expiry dates, bar codes, company logos, serial numbers, etc., to plastic parts or flexible plastic films. These markings are currently mostly executed using conventional techniques, such as printing, hot-stamping, other stamping methods or labelling. However, in particular for plastics, increasing importance is being attached to the contactless, very rapid and flexible method of marking with lasers. With this technique it is possible to apply graphic inscriptions, such as bar codes, at high speed, even to non-planar surfaces. Since the inscription is located within the plastics article itself, it is durably abrasion-resistant.

It is generally known that certain materials, such as polymers like plastics and resins, can upon irradiation with laser light absorb energy from the laser light and are able to transfer this energy into heat which can induce a colour change reaction (=marking) in the material. Laser light absorbers are used to improve the laser light absorption in case the intrinsic ability of a polymer as such to absorb laser light is insufficient.

Many plastics, e.g. polyolefins and polystyrenes, have hitherto been difficult or impossible to mark with a laser. A $CO_2$ laser which emits infrared light in the region of 10.6 μm brings about only very weak, hardly legible marking on polyolefins or polystyrenes, even using very high power. In the case of polyurethane elastomers and polyether ester elastomers, no interaction occurs with Nd-YAG lasers, but engraving occurs using $CO_2$ lasers. It is not permissible for the plastic to reflect or transmit all of the laser light, since there is then no interaction. Nor must excessively strong absorption take place, however, since in this case the plastics evaporate and all that remains is an engraving. The absorption of the laser beams, and therefore the interaction with the material, depends on the chemical structure of the composition and on the laser wavelength used. It is often necessary to add appropriate additives, such as absorbers, in order to render plastics laser-inscribable.

The successful absorber should have a very pale inherent colour and/or need only be employed in very small amounts. From the prior art it is known that the contrasting agent antimony trioxide satisfies such criteria as described in U.S. Pat. No. 4,816,374, U.S. Pat. No. 6,214,917 B1, WO 01/00719 A1 and WO 2009/003976 A1. However, antimony trioxide is toxic and under suspect of being carcinogenic and therefore antimony-free laser-marking additives are desired.

Antimony-free laser-marking additives are known from the literature. For example EP 1 190 988 A2 describes laser-markable compounds comprising bismuth and at least one additional metal. U.S. 2007/029294 A1 is directed to laser-markable compounds of the formula MOCl, in which M is either As, Sb or Bi, as well as $BiONO_3$, $Bi_2O_2CO_3$, BiOOH, BiOF, BiOBr, $Bi_2O_3$, $BiOC_3H_5O_7$, etc. as an additive.

The use of laser-marking additives based on bismuth compounds is well-known. The disadvantage of laser-marking additives based on bismuth is that they are not suitable in all kind of plastics. In certain matrix polymers the bismuth compound shows severe discoloration when high processing temperatures, i.e. >220° C., are used. For example $Bi_2O_3$ cannot be used as colour former for laser-marking of polyamide since during processing an exothermic reaction takes place resulting in a dark product.

WO 2011/050934 A2 is directed to a laser-marking additive which comprises a bismuth containing compound and a functionalized polymer having 0.01 to 50 wt. % of functional groups. The disadvantage of this laser-additive is that the functionalized polymer does not contribute to the colour forming process and therefore reduces the marking performance with respect to especially marking speed when applied in polymers such as polyamide and polyesters. Also because of this, applying this laser marking additive in non or insufficient laser-markable polymers such as polyolefins will result in very poor marking performance with respect to both marking contrast and speed. Moreover, upon processing above the generally low melting point ($T_m$<160° C.) of the functionalized polymer in certain matrix polymers, the laser marking additive will still show discoloration due to migration of the bismuth compound to the matrix polymer causing the undesirable exothermic reaction.

The object of the present invention was therefore to find a non-toxic laser-marking additive which enables high-contrast marking on exposure to laser light and contains only small amounts of heavy metals and further improves the contrast and the resolution at low and high marking speeds.

Surprisingly, it has been found that microspheres comprising a core-shell particle dispersed in a polyolefin matrix which contain as absorber at least one bismuth compound and as colour former at least one non-olefinic polymer compound and the shell contains at least one compatibilizer, do not show the above mentioned disadvantages and are highly suitable as laser-marking additives for all kind of polymers, preferably thermoplastic polymers.

Microspheres as such acting as laser-absorbers based on core-shell particles are known from WO 2004/050766 A1, WO 2004/050767 A1 and WO 2009/003976 A1.

Upon irradiation with laser light, polymeric compositions like plastics that contain the microsphere according to the invention show an unexpected high contrast with a broad range of laser systems even at high marking speeds. Due to the synergistic effect between the laser light absorber(s) and the colour former in the core and the polymer of the shell the light coloured microsphere can act as laser absorber with an improved laser marking performance with respect to contrast and speed compared to the known laser additives which are commercially available and described in the literature. Furthermore, improved performance results in lower dosage in the end product and hence reduced costs are obtained. Moreover, lower dosage in the end product also leads to less influence on all other properties of a laser-markable composition to the present invention when the microsphere according to the present invention is incorporated, as compared to compositions comprising antimony or bismuth compounds of the prior art. Since bismuth is considered as a non-toxic heavy metal it can also be used in medical applications.

Furthermore, lower dosage in the end product means that all other properties such as mechanical properties of a laser-markable composition to the present invention are less influenced when the microsphere according to the present invention is incorporated, as compared to compositions for laser-marking comprising antimony or bismuth compounds of the prior art.

The laser light absorber used can be made of those bismuth compounds that are capable of absorbing laser light of a certain wavelength. In practice this wavelength lies between 157 nm and 10.6 μm, the customary wavelength range of lasers. If lasers with larger or smaller wavelengths become available, other absorbers may also be suitable for application. Examples of such lasers working in said area are $CO_2$ lasers (10.6 μm), Nd:YAG or Nd:YVO$_4$ lasers (1064 nm, 532 nm, 355 nm, 266 nm) and excimer lasers of the following wavelengths: $F_2$ (157 nm), ArF (193 nm), KrCl (222 nm), KrF (248 nm), XeCl (308 nm) and XeF (351 nm), FAYb fiber lasers, diode lasers and diode array lasers. Preferably Nd:YAG lasers and $CO_2$ lasers are used since these types work in a wavelength which is very suitable for the induction of thermal processes for marking purposes.

Suitable examples of laser light absorbers are oxides, hydroxides, halogenides, oxyhalogenides, sulphides, sulphates and phosphates of bismuth. Preferably, the laser absorber(s) is selected from bismuth trioxide ($Bi_2O_3$) and/or bismuth oxychloride (BiOCl). In a preferred embodiment the microsphere according to the present invention contains only one laser-absorber, preferably $Bi_2O_3$.

The microsphere contains 20-90 wt. %, preferably 50-90 wt. % and most preferably 75-90 wt. % in total of the absorber(s), preferably $Bi_2O_3$.

The absorbers, i.e. the bismuth compounds, are for example present in the microsphere in the form of particles. The particle size of the bismuth compound is determined by the requirement that the bismuth compound must be capable of being mixed into the polymer in the core. It is known to the person skilled in the art that this miscibility is determined by the total surface of a certain weight quantity of the bismuth compounds and that the person skilled will readily be able to determine the lower limit of the particle size of the bismuth compounds to be mixed in when knowing the desired size of the microspheres and the desired quantity of absorbers to be mixed in. Generally the $d_{50}$ of the absorbers is in the range of 0.2-10, preferably 0.3-3, and most preferably in the range of 0.5-2 microns.

$Bi_2O_3$ is commercially available, for example from 5N Plus Lübeck GmbH Germany (former MCP-HEK GmbH), Poch S.A. Poland or from Merck Millipore GmbH, Germany.

BiOCl is commercially available from Merck KGaA, ChemService Inc. USA or from PCF Chimie France.

Preferably the used $Bi_2O_3$ has a particle size in the range of 0.2-10, preferably 0.3-3, and most preferably in the range of 0.5-2 microns.

The core of the microsphere contains at least one non-olefinic polymer which is preferably a thermoplastic polymer.

Examples of especially preferred thermoplastic polymers are preferably selected from the following group:
polyphenylenoxide (PPO)
polystyrene (PS) mixtures with >10% PS
polyesters
polysulphones
polycarbonates
polyurethanes
or mixtures thereof.

Examples of polyesters are polybutylene terephthalate (PBT) or polyethylene terephthalate (PET).

An example of a styrenic is styrene-acrylonitril.

To choose a suitable polymer the person skilled in the art will principally be guided by the desired degree of adhesion to the absorbers and the required colour forming ability.

In a preferred embodiment the core contains as colour former PBT or PPO/PS or styrene-ethylene/butylene-styrene (SEBS) or mixtures thereof.

In an especially preferred embodiment, the core of the microsphere consists of
50-90 wt. % of an absorber, preferably $Bi_2O_3$
10-50 wt. % of a non-olefinic polymer colour former, in particular PBT or PPO/PS
based on the core-shell particle.

The adhesion of the polymer of the core to the bismuth compound(s) most preferably is better than that of the core and the compatibilizer (=shell). This secures the integrity of the microsphere during its processing.

It should be avoided that the absorber(s) and the polymer in the core can chemically react with one another. Such chemical reactions could cause degradation of the absorber(s) and/or polymer leading to undesired by-products, discoloration and poor mechanical and marking properties.

In the microsphere according to the present invention the core is embedded by a shell comprising a compatibilizer.

Among others, the compatibilizer is responsible for forming the microsphere during production in case of using reactive extrusion. In a preferred embodiment, the compatibilizer (=shell) and the polymer of the core have a different polarity. Furthermore, the compatibilizer, due to its different polarity than the core, enhances the integrity of the core.

The compatibilizer is preferably a thermoplastic polymer. Preferred thermoplastic polymers contain functional groups such as carboxylic acid groups, alkoxy silane groups or alcohol groups. The compatibilizer in the present invention preferably is a thermoplastic polymer. More preferably the compatibilizer is a grafted thermoplastic polymer. In a preferred embodiment the grafted thermoplastic polymer is a grafted polyolefin. Polyolefin polymers are for example homo- and copolymers of one or more olefin monomers that can be grafted with an ethylenically unsaturated functionalized compound. Examples of suitable polyolefin polymers are ethylene and propylene homo- and copolymers. Examples of suitable ethylene polymers are all thermoplastic homopolymers of ethylene and copolymers of ethylene with as co-monomer one or more α-olefins with 3-10 carbon atoms, in particular propylene, isobutene, 1-butene, 1-hexene, 4-methyl-1-pentene and 1-octene, that can be prepared using the known catalysts such as for example Ziegler-Natta, Phillips and metallocene catalysts. The quantity of co-monomer as a rule is 0-50 wt. %, preferably 5-35 wt. %, based on weight of the total composition. Such polyethylenes are for example known as high-density polyethylene (HDPE), low-density polyethylene (LDPE), linear low-density polyethylene (LLDPE) and linear very low-density polyethylene (VL(L)DPE).

Suitable polyethylenes preferably have a density of 860-970 $kg/m^3$, measured at 23° C. according to ISO 1183. Examples of suitable propylene polymers are homopolymers of propylenes and copolymers of propylene with ethylene, in which the proportion of ethylene amount to at most 30 wt. % and preferably at most 25 wt. %.

Examples of suitable ethylenically unsaturated functionalized compounds are the unsaturated carboxylic acids and esters and anhydrides and metallic or non-metallic salts thereof. Preferably the ethylenic unsaturation in the compound is conjugated with a carbonyl group. Examples are acrylic, methacrylic, maleic, fumaric, itaconic, crotonic, methyl crotonic and cinnamic acid and esters, anhydrides and possible salts thereof. Of the compounds mentioned with at least once carbonyl group, maleic anhydride is preferred.

Examples of suitable ethylenically unsaturated functionalized compounds with at least one epoxy ring are, for example, glycidyl esters of unsaturated carboxylic acids, glycidyl ethers of unsaturated alcohols and of alkyl phenols and vinyl and allyl esters of expoxy carboxylic acids. Glycidyl methacrylate is particularly suitable.

Examples of suitable ethylenically unsaturated functionalized compounds with at least one amine functionality are amine compounds with at least one ethylenically unsaturated group, for example allyl amine, propenyl, butenyl, pentenyl and hexenyl amine, amine ethers, for example isopropenylphenyl ethylamine ether. The amine group and the unsaturation should be in such a position relative to each other that they do not influence the grafting reaction to any undesirable degree. The amines may be unsubstituted but may also be substituted with for example alkyl and aryl groups, halogen groups, ether groups and thioether groups.

Examples of suitable ethylenically unsaturated functionalized compounds with at least one alcohol functionality are all compounds with a hydroxyl group that may or may not be etherified or esterified and an ethylenically unsaturated compound, for example allyl and vinyl ethers of alcohols such as ethyl alcohol and higher branched and unbranched alkyl alcohols as well as allyl and vinyl esters of alcohol substituted acids, preferably carboxylic acids and $C_3$-$C_8$ alkenyl alcohols. Furthermore, the alcohols may be substituted with for example alkyl and aryl groups, halogen groups, ether groups and thioether groups, which do not influence the grafting reaction to any undesirable degree.

In a preferred embodiment the compatibilizer is a functionalized polymer which can be grafted or non-grafted. Especially preferred is a non-grafted copolymer of ethylene and glycidyl methacrylate (=ethylene-GMA).

The quantity of the ethylenically unsaturated functionalized compound in the polyolefin polymer functionalized by grafting preferably is in the range of 0.05 to 1 mg eq. per gramme of polyolefin polymer. Most preferably the compatibilizer is a maleic anhydride grafted polyethylene or maleic anhydride grafted polypropylene.

The quantity of compatibilizer relative to the polymer in the core of the microsphere is for example in the range of 2-50 wt. % and is preferably 2-30 wt. %.

Both the polymer in the core and shell are preferably each independently from one another a thermoplastic polymer, as this will facilitate mixing of the bismuth absorber(s) into the polymer in the core and respectively of the microsphere into a matrix polymer to make it suitable for laser writing.

If the polymer in the core and the compatibilizer in the shell comprise functional groups then these functional groups can be bound to each other. Thus, around the core of the microsphere a shell is present which can be bound to the polymer in the core by the respective functional groups.

The invention further relates to the use of the microspheres as a laser marking additive. The use of the microsphere as a laser absorbing additive in a polymer matrix shows an optimal colour forming ability. The activity of the microsphere seems to be based on the transmission of the energy absorbed from the laser light to the polymer in the core. The polymer can decompose due to this heat release, which causes the colour change.

The absorbers are for example present in the microsphere in the form of particles. The particle size of the absorbers is determined by the requirement that the absorbers must be capable of being mixed into the polymer in the core. It is known to the person skilled in the art that this miscibility is determined by the total surface of a certain weight quantity of absorber and that the person skilled will readily be able to determine the lower limit of the particle size of the absorbers to be mixed in when knowing the desired size of the microspheres and the desired quantity of absorbers to be mixed in.

Finally, the core-shell particles are dispersed into a carrier polymer which is in this invention a polyolefin matrix. This polyolefin matrix does not contain any functionalized group and is preferably a polyethylene, in particular LLDPE. As the carrier polymer the same polymers may be considered as those mentioned above for the compatibilizer, albeit in their non-functionalized form. The quantity of carrier polymer preferably is in the range of 20-60 wt. %, of the total polymer in the core and shell and the absorbers.

In an especially preferred embodiment the microsphere according to the instant application consists of

| | |
|---|---|
| 25-70 wt. % of $Bi_2O_3$ | (=core) |
| 8-25 wt. % of PPO/PS or PBT | (=core) |
| 0.5-7.5 wt. % of grafted polyolefin | (=shell) |
| 20-50 wt. % of polyolefin | (=carrier polymer) |
| 0-5 wt. % of additives | |
| or | |
| 25-70 wt. % of $Bi_2O_3$ | (=core) |
| 8-25 wt. % of PPO/PS or PBT | (=core) |
| 0.5-7.5 wt. % of SEBS | (=shell) |
| 20-50 wt. % of polyolefin | (=carrier polymer) |
| 0-5 wt. % of additives | |
| or | |
| 25-70 wt. % of $Bi_2O_3$ | (=core) |
| 8-25 wt. % of PPO/PS or PBT | (=core) |
| 0.5-7.5 wt. % of ethylene-GMA | (=shell) |
| 20-50 wt. % of polyolefin | (=carrier polymer) |
| 0-5 wt. % of additives | | based on the microsphere whereas the wt. % are in total ≤100%.

The polymer in the core, in the shell and in particular the carrier polymer may contain one or more pigments, colorants and/or dyes or a mixture thereof. This has the advantage that no separate coloured masterbatch has to be added when the microspheres are mixed with a matrix polymer; like a plastic or resin.

Preferably in terms of the size the microspheres according to the present invention have a mean diameter in the range of 0.5-10 μm, most preferably in the range of 0.5-5 μM and especially preferred in the range of 1-3 μm.

To provide a laser markable composition the microsphere is for example mixed into the matrix polymer. It is possible to choose the matrix polymer as the carrier polymer. If desired the matrix polymer can also be added as a further polymer so as to later achieve improve mixing into a larger quantity of the matrix polymer.

The invention also relates to a process for the preparation of the microsphere according to the invention. In a preferred embodiment the microspheres are prepared by reactive extrusion. In a first step the bismuth absorber(s), preferably $Bi_2O_3$, and the melt of the polymer forming the core are mixed. The ratio between the quantity of the polymer forming the core and the quantity of absorber(s) is in the range of 90 vol. %:10 vol. % to 40 vol. %:60 vol. %. More preferably this ratio is in the range of 80 vol. %:20 vol. % to 50 vol. %:50 vol. %. In the second step, the mixture of absorber(s) and polymer melt is mixed with the compatibilizer. Preferably this mixing takes place above the melting point of both the polymer and the compatibilizer, preferably in the presence of a quantity of a non-functionalized carrier polymer. Carrier polymers that are suitable are in particular those which have been mentioned above for the compatibilizer, but in their non-functionalized form. This carrier polymer does not need to be the same as the compatibilizer. The presence of the non-functionalized carrier polymer ensures adequate melt processability of the total mixture so that the desired homogeneous distribution of the microsphere is obtained.

To obtain a laser markable polymer composition the microsphere according to the present invention is mixed into the polymer matrix. It has been found that the matrix polymer containing the microspheres according to the invention can be marked with a very high contrast at very high speed compared to known compositions.

The invention therefore also relates to a laser-markable composition, comprising a matrix polymer and a microsphere according to the present invention.

All known matrix polymers such as plastics, binders, resins, etc. can be used in the laser marking and welding application. Suitable plastics are thermoplastic and thermosetting plastics such as polyethylene (PE), polypropylene (PP), polyamide (PA), polyester, polyether, polyphenylene ether, polyacrylate, polyurethane (PU), polyoxymethylene (POM), polymethacrylate, polymethylmethacrylate (PMMA), polyvinyl acetate (PVAC), polystyrene (PS), acrylonitrile-butadiene-styrene (ABS), acrylonitrile-styrene-acrylate (ASA), ABS graft polymer, polybutylene terephthalate (PBT), polyethylene terephthalate (PET), polyvinyl chloride (PVC), polyvinylidene chloride (PVDC), polyvinylidene fluoride (PVDF), polytetrafluoroethylene (PTFE), polycarbonate (PC), polyether sulfones, polyether ketone, thermopolymer polyurethane (TPU), thermopolymer elastomers (TPE), epoxy resin (EP), silicon resin (SI), unsaturated polyester resin (UP), phenolic formaldehyde resin (PF), urea formaldehyde resin (UF), melamine resin (MF) and copolymers thereof and/or mixtures thereof. The polymer can also be a copolymer or block copolymer, etc. Conventional and suitable additives may be present.

Examples of preferred matrix polymers are ultrahigh-molecular polyethylene (UHMWPE) for example from Solpor™, styrenics, including ABS, styrene acryl nitrile (SAN) and polymethyl(meth)acrylate, polyurethane, polyesters including PET and PBT, polyoxmethylene (POM), polyvinylchloride (PVC), polyethylene (PE), polypropylene (PP), polyamide (PA), polyurethane (PU), thermoplastic vulcanizates, of which Santoprene™ and SARLINK® are examples, thermoplastic elastomers, of which Hytrel® and Arnitel® are examples, and silicone rubbers of which Cenusil® and Geniomer® are examples.

The laser-markable composition according to the instant invention can also contain further additives known for example for enhancing certain properties of the matrix polymer or adding properties to it. Examples of suitable additives are reinforcing materials such as glass fibers and carbon fibers, nano-fillers like clays, including wollstonite, mica, pigments, dyes colorants, fillers such as calcium carbonate, talcum, processing aids, stabilisers, antioxidants, plasticizers, impact modifiers, flame retardants, mould release agents, foaming agents, etc.

The amount of microspheres in the polymer matrix can vary from very small amounts such as 0.1 or 1 volume % up to 70 to 80 vol. % or more, relative to the volume of the compound formed. The microspheres will normally be applied in such amounts that no or less negative influence on the contrast of the laser marking result can be obtained by irradiating the composition.

In the following are given typical ranges for the concentrations of the microspheres in the polymer matrix or compound for the laser-marking. For laser-marking, typically between 0.2 and 2.0 wt. % of microspheres are added to matrix polymer.

The laser-markable composition according to the invention can be prepared simply by mixing the microsphere into the molten matrix polymer.

In general, the incorporation of the microsphere within the matrix polymer takes place by simply mixing the plastics pellets with the absorber and optionally with further additives and/or dyes and/or colorants, followed by shaping with exposure to heat. During incorporation of the microspheres, the plastic pellets may, if desired, be treated with adhesion promoters, organic polymer-compatible solvents, stabilizers, dispersants and/or surfactants resistant to the operating temperatures used. The doped plastics pellets are usually produced by placing the plastics pellets in a suitable mixer, wetting these with any additives, and then adding and incorporating the microspheres. The plastics are generally pigmented by way of a colour concentrate (masterbatch) or compound. The resultant mixture may then be directly processed in an extruder or injection-moulding machine. The mouldings formed during the processing have a very homogeneous absorber distribution. Finally, the laser-marking or laser-welding with a suitable laser takes place.

The plastic is marked and welded with suitable laser radiation as follows.

The method of inscription by the laser is such that the specimen is placed in the path of a pulsed laser beam, preferably an Nd:YAG laser. Inscription by a $CO_2$ laser, e.g. by using a mask technique, is also possible. The desired results can also be achieved by other conventional types of laser whose wavelength is within the region of high absorption of the microspheres used. The marking obtained is determined by the irradiation time (or number of pulses in the case of pulsed lasers) and by the power emitted by the laser, and also by the polymer system used. The power of the laser used depends on the particular application and can readily be determined by the skilled worker in any particular case.

For the laser-marking, the laser used generally has a wavelength within the region from 157 nm to 10.6 μm, preferably within the region from 532 nm to 10.6 μm. Examples which may be mentioned here are a $CO_2$ laser (10.6 μm) and an Nd:YAG laser (1064 nm, 532 nm or 355 nm), and a pulsed UV laser. Excimer lasers have the following wavelengths: $F_2$ excimer laser: 157 nm, Arf excimer laser: 193 nm, KrCl excimer laser: 222 nm, KrF excimer laser: 248 nm, XeCl excimer laser: 308 nm, XeF excimer laser: 351 nm, and frequency-multiplied Nd:YAG laser: wavelength of 355 nm (frequency-tripled) or 265 nm (frequency-quadrupled). Particular preference is given to using Nd:YAG lasers (1064 or 532 nm) and $CO_2$ lasers. The energy densities of the lasers used are generally within the range from 0.3 $mJ/cm^2$ to 50 $J/cm^2$, preferably from 0.3 $mJ/cm^2$ to 10 $J/cm^2$.

When pulsed lasers are used, the pulse frequency is generally within the range from 1 to 150 kHz. Corresponding lasers which can be used in the process of the invention are commercially available.

The inscription with the laser is preferably carried out by introducing the article into the ray path of a $CO_2$ laser (10.6 μm) or a pulsed laser, preferably of an Nd:YAG laser.

The laser welding is carried out by introducing the specimen into the ray path of a continuous wave laser, preferably an Nd:YAG or diode laser. The wavelengths are preferably between 808 and 1100 nm. Since most polymers are more or less transparent at these wavelengths, the absorption property is achieved by the addition of the microspheres. Weldings using other conventional types of laser are also possible if they operate at a wavelength at which the absorber in the microsphere used exhibits high absorption. The welding is determined by the irradiation time and irradiation power of the laser and the plastic system used. The power of the lasers used depends on the respective application and can readily be determined by the person skilled in the art in the individual case.

The compositions containing the microsphere as laser-marking additive according to the present invention can be used in any sector where conventional printing processes have hitherto been used to inscribe or mark matrix polymers.

Almost any plastic object can be obtained in a laser markable or laser writable form. Any kind of object made of a matrix polymer like a plastic can be provided with functional data, barcodes, logos, graphics, pictures and identification codes. Furthermore, they can find application in the
- medical equipment such as tubes, containers for tissue samples or fluids, syringes, pots, covers, catheters,
- automotive business such as fluid containers, cabling, components,
- telecom and E&E fields such as GSM fronts, keyboards, micro circuit breakers,
- security and identification applications such as credit cards, identification cards, animal identification tags, labels, security straps,
- advertising applications such as logos, decoration on corks, golf balls, promotional articles,
- packaging such as mono- and multilayer films, bottles, caps and closures including but not limited to screw caps for bottles, tamper proof caps and synthetic corks.

For example, mouldings made from the plastics of the invention may be used in the electrical industry, electronic industry or motor vehicle industry. With the aid of laser light, it is possible to produce identification markings or inscription markings even at locations to which it is difficult to gain access, for example, on cables, lines, decorative strips, or functional parts in the heating, ventilation or cooling sector, or on switches, plugs, levers or handles which consist of the plastics of the invention. It is also possible for the polymer system of the invention to be used for packaging in the food and drinks sector, or in the toy sector. The markings on the packaging are wipe- and scratch-resistant, resistant to downstream sterilization processes, and can be applied by the marking process in a manner which is hygienically clean. Complete label motifs can be applied durably to the packaging for a reusable system. Another important application sector for laser inscription is that of the marking of plastics to produce individual identification marking for animals, known as cattle tags or ear tags. The information specifically associated with the animal is stored via a barcode system. It can be called up again when required with the aid of a scanner. The inscription must be highly durable since some tags remain on the animals for a number of years.

Laser welding with the microspheres in accordance with the invention can be carried out in all areas where conventional joining methods have hitherto been employed and where it has hitherto not been possible to employ the welding process owing to the laser-transparent polymers and pale colours. The laser-transmissive plastic welding process thus represents an alternative to conventional joining methods, for example high-frequency welding, vibration welding, ultrasound welding, hot-air welding or also the adhesive bonding of plastic parts.

The examples below are intended to illustrate the invention but not to restrict the same. The percentages given are by weight unless otherwise indicated.

EXAMPLES

Method for Preparation of Laser Marking Absorber Concentrate (LMAC Table 1) and the Comparative Compounding Concentrate. (CCC Table 1.1)

Using
as the first polymer (Core polymer):
P1.0 Polybutylene terephthalate 1060 (DSM)
P1.1 Noryl 6850H-100 (mixture of PPO/PS 50/50, Sabic®)
P1.2 Polybutylene terephthalate Crastin 6130 NC010 (Dupont)
as the second polymer: (Shell: Compatibilizer)
P2.0 Fusabond® 525N polyethylene (Dupont) grafted with 0.9 wt. % MA
P2.1 Kraton 1650G (Dupont)
P2.2 Lotader AX8840 random copolymer of ethylene and (8% w/w) glycidyl methacrylate
as the third polymer (Carrier polymer):
P3 Linear low density polyethylene (LLDPE Sabic) M500026
as the absorber:
A-1 Bismuth oxide ($Bi_2O_3$) with a $d_{50}$ of 1 μm (5N Plus Lübeck GmbH)
A-2 LaserFlair 825 (Merck KGaA)
A-3 Micabs A208 (Merck KGaA)
as the matrix polymer:
M-1 Linear low density polyethylene M500026 (Sabic)
M-2 Polyurethane Desmopan® 150 (Bayer).

Method for Preparation of Laser Marking Absorber Concentrate (LMAC Table 1) and the Comparative Compounding Concentrate. (CCC Table 1.1)

Using a twin-screw extruder (Leistritz Mikro 27) a number of laser-marking additive concentrates, LMAC 01-LMAC 06, and comparative compounding concentrates CCC 01-CCC 03 are produced. The compositions of the LMAC s and CCC s are given in Table 1 and 1.1 respectively. The screw speed is 250 for the LMAC 01, CCC 01-CCC 03 and 300 rounds per minute for LMAC 02-04. The throughput for all compounds is 20 kg/h. Temperature for LMAC 01 is 260° C. zone 1 and 280° C. at zone 10, for LMAC 02-LMAC 06 is 260° C. at zone 1 and 280° C. at zone 10, extruder head 300° C. The temperature for CCC 01 is 210° C. zone 1 and 220° C. at zone 10, extruder head 220° C.

TABLE 1

Composition of laser marking absorber concentrates

| | Compound | | | | | |
|---|---|---|---|---|---|---|
| | LMAC 01 | LMAC 02 | LMAC 03 | LMAC 04 | LMAC 05 | LMAC 06 |
| First polymer | P1.0 80 | P1.0 50 | P1.0 20 | P1.1 50 | P1.2 20 | P1.2 50 |
| Absorber | A-1 20 | A-1 50 | A-1 80 | A-1 50 | A-1 80 | A-1 50 |

TABLE 1.1

Composition comparative compound concentrates

| | Compound | | |
|---|---|---|---|
| | CCC 01 | CCC 02 | CCC 03 |
| Matrix polymer | M-1 95 | M-1 95 | M-1 90 |
| Absorber | A-1 5 | | |
| Absorber | | A-2 5 | |
| Absorber | | | A-3 10 |

Method of Preparation of the Laser Marking Concentrates (LMC)

Using a twin-screw extruder (Leistritz Mikro 27) a number of laser-marking concentrates, LMC 01-LMC 07 are produced. The composition of the LMCs is given in Table 2.

The screw speed is 250 rounds per minute and the throughput 20 kg/h. Temperature for LMC 01-LMC 05 is 260° C. at zone 1 and 280° C. at zone 10, extruder head 280° C.

TABLE 2

Composition of laser marking concentrates

| Compound | LMC 01 | LMC 02 | LMC 03 | LMC 04 | LMC 05 | LMC 06 | LMC 07 |
|---|---|---|---|---|---|---|---|
| LMAC 01 | 70 | | | | | | |
| LMAC 02 | | 50 | | | | | |
| LMAC 03 | | | 40 | 50 | | | |
| LMAC 04 | | | | | 50 | | |
| LMAC 05 | | | | | | 70 | |
| LMAC 06 | | | | | | | 50 |
| $2^{nd}$ polymer | P2.0 3 | P2.0 5 | P2.0 16 | P2.0 5 | P2.1 5 | P2.2 1.4 | P2.2 2.5 |
| $3^{rd}$ polymer | P3 27 | P3 45 | P3 44 | P3 45 | P3 45 | P3 28.6 | P3 47.5 |

Method of Preparation of the Laser Marking Diluted Concentrates (LMDC)

Using a twin-screw extruder ((Leistritz Mikro 27) a number of laser-marking diluted concentrates, LMDC 01-LMDC 05 are produced. The composition of the LMDCs is given in Table 3. The screw speed is 250 rounds per minute and the throughput 15 kg/h. The temperature for the diluted concentrates LMDC 01-LMDC 05 is 180° C. at zone 1 and 210° C. at zone 10, extruder head 210° C.

TABLE 3

Composition of laser marking diluted concentrates

| | LMDC 01 | LMDC 02 | LMDC 03 | LMDC 04 | LMDC 05 |
|---|---|---|---|---|---|
| LMC 01 | 9 | | | | |
| LMC 02 | | 20 | | | |
| LMC 04 | | | 20 | | |
| LMC 06 | | | | 10 | |
| LMC 07 | | | | | 10 |
| Matrix polymer | M-1 91 | M-1 80 | M-1 80 | M-1 90 | M-1 90 |

Method of Preparation Laser-Marking Product (LMP)

Laser-marking products were produced on using a twin-screw extruder (Leistritz Mikro 27). The composition of the LMPs and the processing conditions are given in Table 4. The screw speed was 250 rounds per minute at a throughput of 15 kg per hour. The temperature 180° C. at zone 1 and 210° C. at zone 10, extruder head 210° C.

TABLE 4

Composition of laser-marking products (LMP)

| Compound | LMP 01 | LMP 02 | LMP 03 | LMP 04 | LMP 05 |
|---|---|---|---|---|---|
| LMDC 01 | 10 | | | | |
| LMDC 02 | | 10 | | | |
| LMC 03 | | | 6.25 | | |
| LMC 04 | | | | 5 | |
| LMDC 03 | | | | | 10 |
| Matrix polymer | M-1 90 | M-1 90 | M-1 93.75 | M-1 95 | M-1 90 |

Preparation of Laser-Marking Samples

Laser-markable samples (LMSA) are produced using injection moulding. The composition of the LMSAs and the processing conditions are given in Table 5a to 5e. The temperature in zone 1 is set to 190° C. for all samples. The temperature of zone 2, zone 3 and the nose are all 220° C.

TABLE 5a

Composition and processing conditions of laser-marking samples

| | LMSA 01 | LMSA 02 | LMSA 03 | LMSA 04 | LMSA 05 | LMSA 06 | LMSA 07 | LMSA 08 | LMSA 09 |
|---|---|---|---|---|---|---|---|---|---|
| LMP 01 | 100 | 50 | 25 | | | | | | |
| LMP 02 | | | | 100 | 50 | 25 | | | |
| LMP 03 | | | | | | | 100 | 50 | 25 |
| Matrix Polymer | | M-1 50 | M-1 75 | | M-1 50 | M-1 75 | | M-1 50 | M-1 25 |
| $T_{melt}$ [° C.] | 220 | 218 | 220 | 221 | 220 | 225 | 220 | 220 | 220 |

TABLE 5b

Composition and processing conditions of laser-marking samples

| | LMSA 10 | LMSA 11 | LMSA 12 | LMSA 13 | LMSA 14 | LMSA 15 |
|---|---|---|---|---|---|---|
| LMP4 | 100 | 50 | 25 | | | |
| LMP5 | | | | 100 | 50 | 25 |
| Matrix polymer | | M-1 50 | M-1 75 | | M-1 50 | M-1 75 |
| $T_{melt}$ [° C.] | 220 | 218 | 220 | 222 | 220 | 225 |

TABLE 5c

Composition and processing conditions of laser-marking samples

| | LMSA 16 | LMSA 17 | LMSA 18 |
|---|---|---|---|
| LMC 02 | 2 | 1 | 0.5 |
| Matrix polymer | M-2 98 | M-2 99 | M-2 99.5 |
| $T_{melt}$ [° C.] | 220 | 218 | 220 |

TABLE 5d

Composition and processing conditions of laser-marking samples

|  | LMSA 19 | LMSA 20 | LMSA 21 | LMSA 22 | LMSA 23 | LMSA 24 | LMSA 25 | LMSA 26 | LMSA 27 |
|---|---|---|---|---|---|---|---|---|---|
| Matrix polymer | M-1 | M-1 | M-1 | M-1 | M-1 | M-1 | M-1 | M-1 | M-1 |
|  | 90 | 95 | 97.5 | 90 | 95 | 97.5 | 90 | 95 | 97.5 |
| CCC 01 | 10 | 5 | 2.5 | | | | | | |
| CCC 02 | | | | 10 | 5 | 2.5 | | | |
| CCC 03 | | | | | | | 10 | 5 | 2.5 |
| $T_{melt}$ [° C.] | 220 | 218 | 220 | | | | | | |

TABLE 5e

Composition and processing conditions of laser-marking samples

|  | LMSA 28 | LMSA 29 |
|---|---|---|
| Matrix polymer | M-1 | M-1 |
|  | 95.54 | 90 |
| LMDC 04 | 4.46 | |
| LMDC 05 | | 10 |
| $T_{melt}$ [° C.] | 218 | 217 |

Laser-Marking Performance

Laser-marking evaluations are performed with a diode-pumped Trumpf VMc3 11 watt IR laser system. So-called evaluation matrices are marked. In such matrices, the marking speed (v [mm/sec]) and frequency (f [kHz]) are varied at given power (p [%]), focal distance (z=0 [in focus] or 10 mm above the sample and line spacing. Basically the evaluation matrices indicate which contrast can be obtained at certain marking speed with varying laser parameters. An evaluation of the laser-marking performance with respect to contrast and marking speed in terms ranging from excellent (+++++) to poor (-----) is given in Table 6.

TABLE 6

Assessment of the laser-marking performance of the LMSA at a laser power of 95% and a line speed between 1000 and 5000 mm/min

| Sample | Sample description | $Bi_2O_3$ content in weight percentage[1] Focus distance [+mm] | Marking performance 10 |
|---|---|---|---|
| LMSA 01 | matrix polymer: M1 | 0.5 | +++++ |
| LMSA 02 | matrix polymer: M1 | 0.25 | ++++ |
| LMSA 03 | matrix polymer: M1 | 0.125 | +++ |
| LMAS 04 | matrix polymer: M1 | 0.5 | +++++ |
| LMSA 05 | matrix polymer: M1 | 0.25 | ++++ |
| LMSA 06 | matrix polymer: M1 | 0.125 | +++ |
| LMSA 07 | matrix polymer: M1 | 0.5 | +++++ |
| LMSA 08 | matrix polymer: M1 | 0.25 | ++++ |
| LMSA 09 | matrix polymer: M1 | 0.125 | +++ |
| LMSA 10 | matrix polymer: M1 | 0.5 | +++++ |
| LMSA 11 | matrix polymer: M1 | 0.25 | ++++ |
| LMSA 12 | matrix polymer: M1 | 0.125 | +++ |
| LMSA 13 | matrix polymer: M1 | 0.5 | +++++ |
| LMSA 14 | matrix polymer: M1 | 0.25 | ++++ |
| LMSA 15 | matrix polymer: M1 | 0.125 | +++ |
| LMSA 16 | matrix polymer: M2 | 0.5 | +++++ |
| LMSA 17 | matrix polymer: M2 | 0.25 | ++++ |
| LMSA 18 | matrix polymer: M2 | 0.125 | +++ |
| LMSA 19 | matrix polymer: M1 | 0.5 | +++ |
| LMSA 20 | matrix polymer: M1 | 0.25 | +− |
| LMSA 21 | matrix polymer: M1 | 0.125 | −− |
| LMSA 22 | matrix polymer: M1 | 0.5 | ++ |
| LMSA 23 | matrix polymer: M1 | 0.25 | +− |
| LMSA 24 | matrix polymer: M1 | 0.125 | −− |
| LMSA 25 | matrix polymer: M1 | 0.5 | + |
| LMSA 26 | matrix polymer: M1 | 0.25 | −+ |
| LMSA 27 | matrix polymer: M1 | 0.125 | −− |
| LMSA 28 | matrix polymer: M1 | 0.25 | +++++ |
| LMSA 29 | matrix polymer: M1 | 0.25 | +++++ |

[1]with respect to the total amount of the laser-markable composition.

The invention claimed is:

1. A composition comprising microsphere core-shell particles dispersed in a polyolefin carrier, wherein the core of each of the microsphere core-shell particles contains only one laser absorber which is $Bi_2O_3$ or BiOCl and contains at least one non-olefinic polymer compound, and the shell of each of the microsphere core-shell particles contains at least one compatibilizer,
    which compatibilizer is
    a functionalized polymer that is a copolymer of ethylene and glycidyl methacrylate (ethylene-GMA), or
    a grafted polyolefin, or
    styrene-ethylene/butylene-styrene (SEBS), and
    wherein the laser absorber represents 20-90 wt. % of the microsphere.
2. The composition according to claim 1, wherein the laser absorber is BiOCl.
3. The composition according to claim 1, wherein the laser absorber is $Bi_2O_3$.
4. The composition according to claim 1, wherein the non-olefinic polymer is color forming.
5. The composition according to claim 1, wherein the non-olefinic polymer is polyphenylenoxide/polystyrene (PPO/PS) or polybutylene terephthalate (PBT).
6. The composition according to claim 1, wherein the compatibilizer is a functionalized polymer that is the copolymer of ethylene and glycidyl methacrylate (ethylene-GMA).
7. The composition according to claim 1, wherein the compatibilizer is the grafted polyolefin.
8. The composition according to claim 7, wherein the compatibilizer is a grafted polyethylene or grafted polypropylene.
9. The composition according to claim 7, wherein the compatibilizer is maleic anhydride grafted polyethylene or maleic grafted polypropylene.
10. The composition according to claim 1, wherein the compatibilizer is the styrene-ethylene/butylene-styrene (SEBS).

11. The composition according to claim 1, wherein said polyolefin carrier is a linear low-density polyethylene (LLDPE), very low-density polyethylene (VLDPE), low-density polyethylene (LDPE) or metallocene polyethylene (m-PE).

12. The composition according to claim 1, wherein the core, the shell and/or the polyolefin carrier contain(s) additives, which are one or more of reinforcing materials, nano-fillers, pigments, dyes, colorants, fillers, processing aids, stabilizers, antioxidants, plasticizers, impact modifiers, flame retardants, mold release agents or foaming agents.

13. The composition according to claim 1, wherein the microsphere core-shell particles have a mean particle size of 0.5-3.0 microns.

14. The composition according to claim 1, wherein composition comprises

| | |
|---|---|
| 25-70 wt. % of $Bi_2O_3$ | (=core) |
| 8-25 wt. % of PPO/PS or PBT | (=core) |
| 0.5-7.5 wt. % of grafted polyolefin | (=shell) |
| 20-50 wt. % of polyolefin | (=polyolefin carrier) |
| 0-5 wt. % of additives | | based on the total weight of the composition, wherein the wt. % are in total ≤100%.

15. The composition according to claim 1, wherein the composition comprises

| | |
|---|---|
| 25-70 wt. % of $Bi_2O_3$ | (=core) |
| 8-25 wt. % of PPO/PS or PBT | (=core) |
| 0.5-7.5 wt. % of SEBS | (=shell) |
| 20-50 wt. % of polyolefin | (=polyolefin carrier) |
| 0-5 wt. % of additives | | based on the total weight of the composition, wherein the wt. % are in total ≤100%.

16. The composition according to claim 1, wherein the composition comprises

| | |
|---|---|
| 25-70 wt. % of $Bi_2O_3$ | (=core) |
| 8-25 wt. % of PPO/PS or PBT | (=core) |
| 0.5-7.5 wt. % of ethylene-GMA | (=shell) |
| 20-50 wt. % of polyolefin | (=polyolefin carrier) |
| 0-5 wt. % of additives | | based on the total weight of the composition, wherein the wt. % are in total ≤100%.

17. The composition according to claim 1, wherein the microspheres have been produced by reactive extrusion.

18. The composition according to claim 1, wherein the laser absorber represents 50-90 wt. % of the cores of the microsphere and the non-olefinic polymer represents 10-50 wt. % of the cores of the microsphere.

19. A laser-markable composition comprising the composition according to claim 1 and a matrix polymer, thereby forming the laser-markable composition.

20. The laser-markable composition according to claim 19, wherein the amount of $Bi_2O_3$ or BiOCl is 0.125-0.5 wt. % based on the laser-markable composition.

21. A laser-markable and laser-weldable composition comprising a matrix polymer and at least one microsphere core-shell particle, wherein the core of the microsphere core-shell particle contains only one laser absorber which is $Bi_2O_3$ or BiOCl and at least one non-olefinic polymer compound, and the shell of the microsphere core-shell particle contains at least one compatibilizer,
which compatibilizer is
a functionalized polymer that is a copolymer of ethylene and glycidyl methacrylate (ethylene-GMA), or
a grafted polyolefin, or
styrene-ethylene/butylene-styrene (SEBS), and
wherein the laser absorber represents 20-90 wt. % of the at least one microsphere.

22. The composition according to claim 21, wherein the compatibilizer is a functionalized polymer that is the copolymer of ethylene and glycidyl methacrylate (ethylene-GMA).

23. The laser-markable and laser-weldable composition according to claim 21, wherein said composition contains 0.1-1.0 wt. %, based on the total composition of the microsphere.

24. The laser-markable and laser-weldable composition according to claim 21, wherein the matrix polymer is one or more of polyethylene (PE), polypropylene (PP), polyamide (PA), polyester, polyether, polyphenylene ether, polyacrylate, polyurethane (PU), polyoxymethylene (POM), polymethacrylate, polymethylmethacrylate (PMMA), polyvinyl acetate (PVAC), polystyrene (PS), acrylonitrile-butadiene-styrene (ABS), acrylonitrile-styrene-acrylate (ASA), ABS graft polymer, polybutylene terephthalate (PBT), polyethylene terephthalate (PET), polyvinyl chloride (PVC), polyvinylidene chloride (PVDC), polyvinylidene fluoride (PVDF), polytetrafluoroethylene (PTFE), polycarbonate (PC), polyether sulfones, polyether ketone, thermopolymer polyurethane (TPU), thermopolymer elastomers (TPE), epoxy resin (EP), silicon resin (SI), unsaturated polyester resin (UP), phenolic formaldehyde resin (PF), urea formaldehyde resin (UF), melamine resin (MF), ultrahigh-molecular polyethylene (UHMWPE), styrenics, styrolacrylnitril (SAN), thermoplastic vulcanizates, thermoplastic elastomers, silicone rubbers, or copolymers thereof and/or mixtures thereof.

25. A process for producing a laser-markable or laser-weldable composition according to claim 21, said process comprising mixing said matrix polymer with the at least one microsphere and optionally with further additives, and shaping the composition with exposure to heat.

* * * * *